United States Patent
Taki et al.

(10) Patent No.: US 9,583,280 B2
(45) Date of Patent: Feb. 28, 2017

(54) ELECTRICITY STORAGE DEVICE

(71) Applicant: ADEKA CORPORATION, Tokyo (JP)

(72) Inventors: Takayuki Taki, Tokyo (JP); Hiroaki Watanabe, Tokyo (JP); Atsuki Shibuya, Tokyo (JP); Akiko Tasaki, Tokyo (JP); Eiji Katsuno, Tokyo (JP)

(73) Assignee: ADEKA CORPORATION, Tokyo (JP)

( * ) Notice: Subject to any disclaimer, the term of this patent is extended or adjusted under 35 U.S.C. 154(b) by 65 days.

(21) Appl. No.: 14/416,393

(22) PCT Filed: Jul. 12, 2013

(86) PCT No.: PCT/JP2013/069165
§ 371 (c)(1),
(2) Date: Jan. 22, 2015

(87) PCT Pub. No.: WO2014/017321
PCT Pub. Date: Jan. 30, 2014

(65) Prior Publication Data
US 2015/0206664 A1  Jul. 23, 2015

(30) Foreign Application Priority Data
Jul. 26, 2012  (JP) ................................ 2012-166293

(51) Int. Cl.
| | | |
|---|---|---|
| *H01G 11/54* | (2013.01) | |
| *H01M 10/052* | (2010.01) | |
| *H01M 10/0567* | (2010.01) | |
| *H01G 11/58* | (2013.01) | |
| *H01G 11/64* | (2013.01) | |
| *H01G 11/06* | (2013.01) | |
| *H01M 10/0525* | (2010.01) | |
| *H01G 11/38* | (2013.01) | |
| *H01G 11/50* | (2013.01) | |
| *H01M 10/42* | (2006.01) | |

(52) U.S. Cl.
CPC ............ *H01G 11/58* (2013.01); *H01G 11/06* (2013.01); *H01G 11/64* (2013.01); *H01M 10/052* (2013.01); *H01M 10/0525* (2013.01); *H01M 10/0567* (2013.01); *H01G 11/38* (2013.01); *H01G 11/50* (2013.01); *H01M 10/4235* (2013.01); *H01M 2300/0037* (2013.01); *Y02E 60/13* (2013.01); *Y02T 90/32* (2013.01)

(58) Field of Classification Search
CPC ................. H01G 11/06; H01G 11/62
See application file for complete search history.

(56) References Cited

U.S. PATENT DOCUMENTS

| | | | |
|---|---|---|---|
| 5,626,981 A | 5/1997 | Simon et al. | |
| 9,023,536 B2 * | 5/2015 | Taki ...................... | H01M 4/525 |
| | | | 429/326 |
| 9,337,511 B2 * | 5/2016 | Taki ..................... | H01M 10/052 |
| 2007/0059607 A1 | 3/2007 | Nakanishi et al. | |
| 2008/0318136 A1 | 12/2008 | Amine et al. | |
| 2012/0082890 A1 | 4/2012 | Dong et al. | |
| 2013/0149603 A1* | 6/2013 | Taki ...................... | H01M 4/587 |
| | | | 429/188 |
| 2013/0177822 A1 | 7/2013 | Taki et al. | |

FOREIGN PATENT DOCUMENTS

| | | |
|---|---|---|
| JP | 63-102173 | 5/1988 |
| JP | 04-87156 | 3/1992 |
| JP | 05-74486 | 3/1993 |
| JP | 10-50342 | 2/1998 |
| JP | 2001-006729 | 1/2001 |
| JP | 2001-052965 | 2/2001 |
| JP | 2002-260440 | 9/2002 |
| JP | 2003-323915 | 11/2003 |
| JP | 2004296431 | 10/2004 |
| JP | 2008-146930 | 6/2008 |
| JP | 2008-300523 | 12/2008 |
| JP | 2009-16441 | 1/2009 |
| JP | 2009-65074 | 3/2009 |
| JP | 2012028177 | 2/2012 |
| JP | 2012-109092 | 6/2012 |

OTHER PUBLICATIONS

Supplementary European Search Report dated Apr. 26, 2016 in corresponding European Patent Application No. 13822676.6.
International Search Report, PCT/JP2013/069165, Aug. 20, 2013.
PCT International Preliminary Report on Patentability, dated Feb. 5, 2015, in corresponding International Patent Application No. PCT/JP2013/069165.

* cited by examiner

*Primary Examiner* — Carol M Koslow
(74) *Attorney, Agent, or Firm* — Young & Thompson (57) ABSTRACT

An electricity storage device maintains low internal resistance and high electric capacity. The nonaqueous-electrolytic-solution hybrid electricity storage device employs an anode into/from which lithium can be intercalated and deintercalated and a cathode including activated carbon, even after high-temperature storage and/or high-temperature charging/discharging. Specifically, this electricity storage device includes an anode into/from which lithium can be intercalated and deintercalated, a cathode that includes activated carbon, and a nonaqueous electrolytic solution, wherein the electricity storage device employs a nonaqueous electrolytic solution that includes at least one type of compound represented by one of general formulas (1) to (5). Details on the general formulas (1) to (5) are as described in the Description.

10 Claims, 1 Drawing Sheet

ELECTRICITY STORAGE DEVICE

TECHNICAL FIELD

The present invention relates to an electricity storage device that employs a nonaqueous electrolytic solution including a specific electrolyte additive.

BACKGROUND ART

In recent years, nonaqueous-electrolytic-solution secondary batteries having high voltage and high energy density have become widely used as power sources. In order to make effective use of such high-density electricity storage devices, attempts are being made to make more efficient use of energy by employing capacitors capable of high-speed charging/discharging as power buffers. Various nonaqueous-electrolytic-solution hybrid electricity storage devices including lithium ions in the nonaqueous electrolytic solution have been proposed as capacitors having a large electricity storage amount.

As for nonaqueous-electrolytic-solution secondary batteries, various additives for nonaqueous electrolytic solutions have been proposed in order to improve the stability and electric characteristics of the nonaqueous-electrolytic-solution secondary batteries. Examples of additives that have been proposed include 1,3-propanesultone (see, for example, Patent Literature 1), vinylethylene carbonate (see, for example, Patent Literature 2), vinylene carbonate (see, for example, Patent Literature 3), 1,3-propanesultone and butanesultone (see, for example, Patent Literature 4), vinylene carbonate (see, for example, Patent Literature 5), and vinylethylene carbonate (see, for example, Patent Literature 6). Among the above, vinylene carbonate has been widely used because of its excellent effect. These additives form a stable film called a solid electrolyte interface (SEI; solid electrolyte film) on the surface of the anode. It is thought that covering the anode surface with this film suppresses the reduction/decomposition of the nonaqueous electrolytic solution.

Unfortunately, little has been proposed regarding electrolytic-solution additives having an excellent effect on hybrid electricity storage devices that employ activated carbon as the cathode and carbon materials used in lithium-ion secondary batteries as the anode.

CITATION LIST

Patent Literature

Patent Literature 1: JP-A-63-102173
Patent Literature 2: JP-A-4-087156
Patent Literature 3: JP-A-5-074486
Patent Literature 4: JP-A-10-050342
Patent Literature 5: U.S. Pat. No. 5,626,981
Patent Literature 6: JP-A-2001-006729

SUMMARY OF INVENTION

Technical Problem

Thus, an objective of the present invention is to maintain low internal resistance and high electric capacity in a nonaqueous-electrolytic-solution hybrid electricity storage device that employs an anode into/from which lithium can be intercalated and deintercalated and a cathode including activated carbon, even after high-temperature storage and/or high-temperature charging/discharging.

Solution to Problem

Inventors have made diligent investigation, and have found that the aforementioned objective can be achieved by using a nonaqueous electrolytic solution including a compound with a specific structure, thus arriving at the present invention.

The present invention provides an electricity storage device including an anode into/from which lithium can be intercalated and deintercalated, a cathode that includes activated carbon, and a nonaqueous electrolytic solution that includes at least one type of compound represented by one of the following general formulas (1) to (5):

[Chem. 1]

(1)

(2)

(3)

(4)

(5)

in the above general formula (1), $R^1$ and $R^2$ each independently represent a hydrogen atom or a $C_{1-8}$ alkyl group, $R^3$ represents a $C_{1-8}$ aliphatic hydrocarbon group that includes or does not include an unsaturated bond(s), and the aliphatic hydrocarbon group represented by $R^3$ may be substituted by a halogen atom(s);

in the above general formula (2), $R^4$ and $R^5$ each independently represent a hydrogen atom or a $C_{1-8}$ alkyl group, $R^6$ represents a $C_{1-8}$ aliphatic hydrocarbon group that includes or does not include an unsaturated bond(s), the aliphatic hydrocarbon group represented by $R^6$ may be substituted by a halogen atom, and n represents 1 or 2;

in the above general formula (3), $R^7$, $R^8$, $R^9$, and $R^{10}$ each independently represent a $C_{1-8}$ aliphatic hydrocarbon group that includes or does not include an unsaturated bond(s), or a $C_{6-8}$ aromatic hydrocarbon group, $R^7$ and $R^8$ may also represent a fluorine atom, the aliphatic hydrocarbon group and the aromatic hydrocarbon group represented by $R^7$, $R^8$, $R^9$, and $R^{10}$ may be substituted by a halogen atom(s), and $R^{11}$ represents an oxygen atom or a $C_{1-8}$ alkylene group that includes or does not include an ether group(s);

in the above general formula (4), $R^{12}$, $R^{13}$, $R^{14}$, $R^{15}$, $R^{16}$, and $R^{17}$ each independently represent a $C_{1-8}$ aliphatic hydrocarbon group that includes or does not include an unsaturated bond(s), and $R^{18}$ represents a $C_{2-6}$ bivalent aliphatic hydrocarbon group including an unsaturated bond(s), or a bivalent aromatic hydrocarbon group; and in the above general formula (5), $R^{19}$, $R^{20}$, and $R^{21}$ each independently represent a $C_{1-8}$ aliphatic hydrocarbon group that includes or does not include an unsaturated bond(s), and m represents 1 or 2.

Advantageous Effects of Invention

According to the present invention, it is possible to maintain low internal resistance and high electric capacity in a hybrid electricity storage device that employs an anode into/from which lithium can be intercalated and deintercalated and a cathode including activated carbon, even after high-temperature storage or high-temperature charging/discharging, and to improve the storability of the nonaqueous electrolytic solution.

DESCRIPTION OF EMBODIMENTS

The electricity storage device of the present invention will be described in detail below according to preferred embodiments thereof.

<Anode>

The anode into/from which lithium can be intercalated and deintercalated, which is employed in the present invention, is not particularly limited so long as lithium can be intercalated and deintercalated, but is preferably as follows. That is, a sheet obtained by coating a charge collector with a slurry made by mixing an anode active material and a binding agent in an organic solvent or water, and then drying the slurry is used as the anode of the electricity storage device of the present invention, and an electroconductive material is blended thereto if necessary.

As for the anode active material, for example, natural graphite, artificial graphite, sparingly-graphitizable carbon, easily-graphitizable carbon, lithium, lithium alloy, tin alloy, silicon alloy, silicon oxide, and/or titanium oxide is used singly, or a plurality of types of the above are used in combination, but a carbon material, such as natural graphite, artificial graphite, sparingly-graphitizable carbon, or easily-graphitizable carbon, is always included. The content of carbon material in the anode active material is preferably 50-100 mass %, and more preferably 80-100 mass %.

Examples of the binding agent for the anode include, although not limited to, polyvinylidene fluoride, polytetrafluoroethylene, EPDM, SBR, NBR, fluorine rubber, and polyacrylic acid. The amount of anode binding agent used with respect to 100 parts by mass of the anode active material is preferably 0.001-5 parts by mass, more preferably 0.05-3 parts by mass, and most preferably 0.01-2 parts by mass.

Examples of the solvent for making the slurry for the anode include, although not limited to, N-methylpyrrolidone, dimethylformamide, dimethylacetamide, methylethyl ketone, cyclohexanone, methyl acetate, methyl acrylate, diethyltriamine, N,N-dimethylaminopropylamine, polyethylene oxide, and tetrahydrofuran. The amount of solvent used with respect to 100 parts by mass of the anode active material is preferably 30-300 parts by mass, and more preferably 50-200 parts by mass.

As for the anode charge collector, for example, copper, nickel, stainless steel, or nickel-plated steel is normally used.

Examples of the electroconductive material blended as necessary include, although not limited to: graphene; graphite particulates; carbon black, such as acetylene black and Ketjen black; amorphous carbon particulates such as needle coke; and carbon nanofibers.

<Cathode>

The activated-carbon-including cathode, which is employed in the present invention, is not limited in terms of the alkali activation method, particle diameter, and surface area of the activated carbon, and is not particularly limited so long as activated carbon is used, and a sheet obtained by coating a charge collector with a slurry made by mixing activated carbon, a binding agent, an electroconductive material, etc., in an organic solvent or water, and then drying the slurry is used as the cathode.

The binding agent for the cathode and the solvent for making the slurry are similar to those used for the anode. The amount of cathode binding agent used with respect to 100 parts by mass of the cathode active material is preferably 0.001-20 parts by mass, more preferably 0.01-10 parts by mass, and most preferably 0.02-8 parts by mass. The amount of cathode solvent used with respect to 100 parts by mass of the activated carbon is preferably 30-300 parts by mass, and more preferably 50-200 parts by mass.

Examples of the electroconductive material for the cathode include, although not limited to: graphene; graphite particulates; carbon black, such as acetylene black and Ketjen black; amorphous carbon particulates such as needle coke; and carbon nanofibers. The amount of cathode electroconductive material used with respect to 100 parts by mass of the cathode active material is preferably 0.01-20 parts by mass, and more preferably 0.1-10 parts by mass.

As for the cathode charge collector, for example, aluminum, stainless steel, or nickel-plated steel is normally used.

<Nonaqueous Electrolytic Solution>

The nonaqueous electrolytic solution used in the present invention (referred to hereinafter also as "nonaqueous electrolytic solution of the present invention") is a nonaqueous electrolytic solution in which a lithium salt is dissolved in an organic solvent, and includes a compound represented by one of the aforementioned general formulas (1) to (5).

Examples of the $C_{1-8}$ alkyl group represented by $R^1$ and $R^2$ in general formula (1) include methyl, ethyl, propyl, isopropyl, butyl, isobutyl, secondary butyl, t-butyl, pentyl, isopentyl, secondary pentyl, t-pentyl, hexyl, secondary hexyl, heptyl, secondary heptyl, octyl, secondary octyl, 2-methylpentyl, and 2-ethylhexyl.

Because of excellent charging characteristics and small negative effect on the migration of lithium ions, $R^1$ and $R^2$ are each preferably a hydrogen atom, methyl, ethyl or propyl, more preferably a hydrogen atom or methyl, and particularly preferably a hydrogen atom.

The $C_{1-8}$ aliphatic hydrocarbon group represented by $R^3$ in the general formula (1) either includes or does not include an unsaturated bond. Groups similar to the $C_{1-8}$ alkyl group represented by the aforementioned $R^1$ are examples of groups that do not include an unsaturated bond. Groups that include an unsaturated bond are groups in which a portion of the carbon-carbon single bonds in the aforementioned alkyl group has been changed to a double bond or a triple bond; although the number and positions of the double/triple bonds are not particularly limited, it is preferable that the end of the $R^3$ substituent is a double bond or triple bond, and concrete examples include vinyl, allyl, 3-butenyl, isobutenyl, 4-pentenyl, 5-hexenyl, 6-heptenyl, 7-octenyl, ethynyl, 2-propynyl, 3-butynyl, 1-methyl-2-propynyl, and 1,1-dimethyl-2-propynyl.

The aliphatic hydrocarbon group represented by $R^3$ may be substituted by a halogen atom, and examples of such substituents include chloromethyl, trifluoromethyl, 2-fluoroethyl, 2-chloroethyl, 2,2,2-trifluoroethyl, 2,2,2-trichloroethyl, 1,1,2,2-tetrafluoroethyl, pentafluoroethyl, pentachloroethyl, 3-fluoropropyl, 2-chloropropyl, 3-chloropropyl, 1-chloro-1-methylethyl, 3,3,3-trifluoropropyl, 2,2,3,3-tetrafluoropropyl, heptafluoropropyl, 2-chlorobutyl, 3-chlorobutyl, 4-chlorobutyl, 3-chloro-2-butyl, (1-chloromethyl)propyl, 2-chloro-1,1-dimethylethyl, 3-chloro-2-methylpropyl, 5-chloropentyl, 3-chloro-2-methylpropyl, 3-chloro-2,2-dimethylpropyl, and 6-chlorohexyl.

Because the internal resistance of the electricity storage device can be reduced, $R^3$ is preferably methyl, ethyl, propyl, isopropyl, butyl, pentyl, 2-propynyl, 3-chloropropyl, 3-chlorobutyl or 4-chlorobutyl, more preferably methyl, ethyl, propyl or 2-propynyl, and particularly preferably ethyl or 2-propynyl.

Of the compounds represented by the general formula (1), examples of compounds in which $R^1$ and $R^2$ are hydrogen atoms include methylbis(2-propynyl)phosphate, ethylbis(2-propynyl)phosphate, propylbis(2-propynyl)phosphate, butylbis(2-propynyl)phosphate, pentylbis(2-propynyl)phosphate, allylbis(2-propynyl)phosphate, tris(2-propynyl)phosphate, 2-chloroethylbis(2-propynyl)phosphate, 2,2,2-trifluoroethylbis(2-propynyl)phosphate, and 2,2,2-trichloroethylbis(2-propynyl)phosphate.

Examples of compounds in which $R^1$ is methyl and $R^2$ is a hydrogen atom include methylbis(1-methyl-2-propynyl)phosphate, ethylbis(1-methyl-2-propynyl)phosphate, propylbis(1-methyl-2-propynyl)phosphate, butylbis(1-methyl-2-propynyl)phosphate, pentylbis(1-methyl-2-propynyl)phosphate, allylbis(1-methyl-2-propynyl)phosphate, 2-propynylbis(1-methyl-2-propynyl)phosphate, tris(1-methyl-1-methyl-2-propynyl)phosphate, 2-chloroethylbis(1-methyl-2-propynyl)phosphate, 2,2,2-trifluoroethylbis(1-methyl-2-propynyl)phosphate, and 2,2,2-trichloroethylbis(1-methyl-2-propynyl)phosphate.

Of the compounds represented by the general formula (1), examples of compounds in which $R^1$ and $R^2$ are methyl include methylbis(1,1-dimethyl-2-propynyl)phosphate, ethylbis(1,1-dimethyl-2-propynyl)phosphate, propylbis(1,1-dimethyl-2-propynyl)phosphate, butylbis(1,1-dimethyl-2-propynyl)phosphate, pentylbis(1,1-dimethyl-2-propynyl)phosphate, allylbis(1,1-dimethyl-2-propynyl)phosphate, 2-propynylbis(1,1-dimethyl-2-propynyl)phosphate, tris(1,1-dimethyl-2-propynyl)phosphate, 2-chloroethylbis(1,1-dimethyl-2-propynyl)phosphate, 2,2,2-trifluoroethylbis(1,1-dimethyl-2-propynyl)phosphate, and 2,2,2-trichloroethylbis(1,1-dimethyl-2-propynyl)phosphate.

The compound represented by the general formula (1) is preferably methylbis(2-propynyl)phosphate, ethylbis(2-propynyl)phosphate, propylbis(2-propynyl)phosphate, butylbis(2-propynyl)phosphate, pentylbis(2-propynyl)phosphate, tris(2-propynyl)phosphate, or 2-chloroethylbis(2-propynyl)phosphate, more preferably ethylbis(2-propynyl)phosphate, propylbis(2-propynyl)phosphate, butylbis(2-propynyl)phosphate, or tris(2-propynyl)phosphate, and particularly preferably ethylbis(2-propynyl)phosphate or tris(2-propynyl)phosphate.

Groups similar to the groups represented by $R^1$ in the aforementioned general formula (1) are examples of the $C_{1-8}$ alkyl group represented by $R^4$ and $R^5$ in the general formula (2). For the same reason as $R^1$, $R^4$ and $R^5$ are each preferably a hydrogen atom, methyl, ethyl or propyl, more preferably a hydrogen atom or methyl, and particularly preferably a hydrogen atom.

Groups similar to the groups represented by $R^3$ in the aforementioned general formula (1) are examples of the aliphatic hydrocarbon group represented by $R^6$ in the general formula (2). Because the internal resistance of the electricity storage device is reduced, the group represented by $R^6$ is preferably methyl, ethyl, propyl, isopropyl, butyl, pentyl, 2-propynyl, 3-chloropropyl, 3-chlorobutyl or 4-chlorobutyl, more preferably methyl, ethyl, propyl or 2-propynyl, and particularly preferably methyl or ethyl.

In the general formula (2), n represents the number 1 or 2. It is preferable that n is 2, because it is easy to perform the phosphoric ester reaction from an alkyne diol, which is a raw material, and the intended compound can be obtained with high yield.

Of the compounds represented by the general formula (2), examples of compounds in which n is 1 include 2-butyne-1,4-diol tetramethyl diphosphate, 2-butyne-1,4-diol tetraethyl diphosphate, 2-butyne-1,4-diol tetrapropyl diphosphate, 2-butyne-1,4-diol tetraisopropyl diphosphate, 2-butyne-1,4-diol tetrabutyl diphosphate, 2-butyne-1,4-diol tetrapentyl diphosphate, 2-butyne-1,4-diol tetrakis(2-propynyl) diphosphate, 2-butyne-1,4-diol tetrakis(3-chloropropyl) diphosphate, 2-butyne-1,4-diol tetrakis(3-chlorobutyl) diphosphate, and 2-butyne-1,4-diol tetrakis(4-chlorobutyl) diphosphate. Among the above, 2-butyne-1,4-diol tetramethyl diphosphate, 2-butyne-1,4-diol tetraethyl diphosphate, 2-butyne-1,4-diol tetrapropyl diphosphate, and 2-butyne-1,4-diol tetrakis(2-propynyl)diphosphate are preferable, and 2-butyne-1,4-diol tetramethyl diphosphate and 2-butyne-1,4-diol tetrakis(2-propynyl)diphosphate are more preferable.

Further, of the compounds represented by the general formula (2), examples of compounds in which n is 2 include 2,4-hexadiyne-1,6-diol tetramethyl diphosphate, 2,4-hexadiyne-1,6-diol tetraethyl diphosphate, 2,4-hexadiyne-1,6-diol tetrapropyl diphosphate, 2,4-hexadiyne-1,6-diol tetraisopropyl diphosphate, 2,4-hexadiyne-1,6-diol tetrabutyl diphosphate, 2,4-hexadiyne-1,6-diol tetrapentyl diphosphate, 2,4-hexadiyne-1,6-diol tetrakis(2-propynyl)diphosphate, 2,4-hexadiyne-1,6-diol tetrakis(3-chloropropyl)diphosphate, 2,4-hexadiyne-1,6-diol tetrakis(3-chlorobutyl) diphosphate, and 2,4-hexadiyne-1,6-diol tetrakis(4-chlorobutyl)diphosphate. Among the above, 2,4-hexadiyne-1,6-diol tetramethyl diphosphate, 2,4-hexadiyne-1,6-diol tetraethyl diphosphate, 2,4-hexadiyne-1,6-diol tetrapropyl diphosphate, and 2,4-hexadiyne-1,6-diol tetrakis(2-propynyl)diphosphate are preferable, and 2,4-hexadiyne-1,6-diol tetramethyl diphosphate and 2,4-hexadiyne-1,6-diol tetrakis(2-propynyl) diphosphate are more preferable.

Examples of the $C_{1-8}$ aliphatic hydrocarbon group represented by $R^7$, $R^8$, $R^9$, and $R^{10}$ in the general formula (3) include aliphatic hydrocarbon groups or cycloalkyl groups represented by the aforementioned $R^3$.

Examples of cycloalkyl groups include cyclopentyl, cyclohexyl, cyclohexylmethyl, and 4-methylcyclohexyl.

Examples of the $C_{6-8}$ aromatic hydrocarbon group represented by $R^7$, $R^8$, $R^9$, and $R^{10}$ in the general formula (3) include phenyl, toluyl, xylyl, and benzyl.

The aliphatic hydrocarbon group and the aromatic hydrocarbon group represented by $R^7$, $R^8$, $R^9$, and $R^{10}$ may be substituted by a halogen atom, and examples other than those given for the aforementioned $R^3$ include pentafluorocyclohexyl, 4-fluorocyclohexylmethyl, 2-chlorophenyl, 3-chlorophenyl, 4-chlorophenyl, 2-fluorophenyl, 3-fluorophenyl, 4-fluorophenyl, and 2,4,6-chlorophenyl.

Among the groups represented by $R^7$, $R^8$, $R^9$, and $R^{10}$, methyl and ethyl are preferable, and methyl is more preferable, because of excellent charging characteristics and the small negative effect on the migration of lithium ions.

Examples of the $C_{1-8}$ alkylene group that does not include an ether group as represented by $R^{11}$ in the general formula (3) include methylene, ethane-1,2-diyl, propane-1,3-diyl, butane-1,4-diyl, pentane-1,5-diyl, hexane-1,6-diyl, heptane-1,7-diyl, octane-1,8-diyl, and 2-methylbutane-1,4-diyl.

A $C_{1-8}$ alkylene group that includes an ether group may be a group in which a discretionary carbon-carbon bond in the aforementioned $C_{1-8}$ alkylene is interrupted by an oxygen atom, and concrete examples include 2-oxapropylene, 3-oxapentylene, 4-oxaheptylene, 2,4-dioxapentylene, and 3,5-dioxaheptylene. Preferably, the number of carbon atoms is from 4 to 8.

Among the groups represented by $R^{11}$, ethane-1,2-diyl, propane-1,3-diyl, butane-1,4-diyl, 2-methylbutane-1,4-diyl, 4-oxaheptylene, and an oxygen atom are preferable, and ethane-1,2-diyl, 4-oxaheptylene, and an oxygen atom are more preferable, and ethane-1,2-diyl and an oxygen atom are particularly preferable, because of excellent charging characteristics and the small negative effect on the migration of lithium ions.

Examples of compounds represented by the general formula (3) include 1,2-bis(fluorodimethylsilyl)ethane, 1,2-bis(fluorodiethylsilyl)ethane, 1,2-bis(fluorodipropylsilyl)ethane, 1,2-bis(fluorodibutylsilyl)ethane, 1,3-bis(fluorodimethylsilyl)propane, 1,2-bis(fluorodiethylsilyl)propane, 1,3-bis(fluorodipropylsilyl)propane, 1,3-bis(fluorodibutylsilyl)propane, 1,4-bisaluorodimethylsilyl)butane, 1,4-bis(fluorodiethylsilyl)butane, 1,4-bis(fluorodipropylsilyl)butane, 1,4-bis(fluorodibutylsilyl)butane, 1,5-bis(fluorodimethylsilyl)pentane, 1,5-bis(fluorodiethylsilyl)pentane, 1,5-bis(fluorodipropylsilyl)pentane, 1,5-bis(fluorodibutylsilyl)pentane, 1,6-bis(fluorodimethylsilyl)hexane, 1,6-bis(fluorodiethylsilyl)hexane, 1,6-bis(fluorodipropylsilyl)hexane, 1,6-bis(fluorodibutylsilyl)hexane, 1,7-bis(fluorodimethylsilyl)heptane, 1,7-bis(fluorodiethylsilyl)heptane, 1,7-bis(fluorodipropylsilyl)heptane, 1,7-bis(fluorodibutylsilyl)heptane, 1,8-bis(fluorodimethylsilyl)octane, 1,8-bis(fluorodiethylsilyl)octane, 1,8-bis(fluorodipropylsilyl)octane, 1,8-bis(fluorodibutylsilyl)octane, 1,4-bis(fluorodimethylsilyl)-2-methylbutane, 1,4-bis(fluorodiethylsilyl)-2-methylbutane, 1,4-bis(fluorodipropylsilyl)-2-methylbutane, 1,4-bis(fluorodibutylsilyl)-2-methylbutane, 1,7-bis(fluorodimethylsilyl)-3-oxaheptane, 1,3-difluoro-1,1,3,3-tetramethyldisiloxane, 1,3-difluoro-1,3-diphenyl-1,3-dimethyldisiloxane, 1,1-bis(difluoromethylsilyl)methane, 1,2-bis(difluoromethylsilyl)ethane, 1,2-bis(difluoroethylsilyl)ethane, 1,2-bis(difluoropropylsilyl)ethane, 1,2-bis(difluorobutylsilyl)ethane, 1,2-bis(difluoropentylsilyl)ethane, 1,2-bis(difluorohexylsilyl)ethane, 1,2-bis(difluoroheptylsilyl)ethane, 1,2-bis(difluorooctylsilyl)ethane, 1,4-bis(difluoromethylsilyl)butane, 1,4-bis(difluoroethylsilyl)butane, 1,4-bis(difluoropropylsilyl)butane, 1,4-bis(difluorobutylsilyl)butane, 1,4-bis(difluoropentylsilyl)butane, 1,4-bis(difluorohexylsilyl)butane, 1,4-bis(difluoroheptylsilyl)butane, 1,4-bis(difluorooctylsilyl)butane, 1,4-bis(difluoromethylsilyl)-2-methylbutane, 1,4-bis(difluoroethylsilyl)-2-methylbutane, 1,4-bis(difluoropropylsilyl)-2-methylbutane, 1,4-bis(difluorobutylsilyl)-2-methylbutane, 1,4-bis(difluoropentylsilyl)-2-methylbutane, 1,4-bis(difluorohexylsilyl)-2-methylbutane, 1,4-bis(difluoroheptylsilyl)-2-methylbutane, 1,4-bis(difluorooctylsilyl)-2-methylbutane, 1,6-bis(difluoromethylsilyl)hexane, 1,6-bis(difluoroethylsilyl)hexane, 1,6-bis(difluoropropylsilyl)hexane, 1,6-bis(difluorobutylsilyl)hexane, 1,6-bis(difluoropentylsilyl)hexane, 1,6-bis(difluorohexylsilyl)hexane, 1,6-bis(difluoroheptylsilyl)hexane, 1,6-bis(difluorooctylsilyl)hexane, and 1,7-bis(difluoromethylsilyl)-4-oxaheptane. Among the above, 1,2-bis(fluorodimethylsilyl)ethane, 1,4-bis(fluorodimethylsilyl)-2-methylbutane, 1,3-difluoro-1,1,3,3-tetramethyldisiloxane, 1,1-bis(difluoromethylsilyl)methane, 1,2-bis(difluoromethylsilyl)ethane, 1,4-bis(difluoromethylsilyl)butane, and 1,7-bis(difluoromethylsilyl)-4-oxaheptane are preferable, and 1,2-bis(fluorodimethylsilyl)ethane, 1,3-difluoro-1,1,3,3-tetramethyldisiloxane, and 1,2-bis(difluoromethylsilyl)ethane are more preferable.

Groups similar to the aliphatic hydrocarbon group represented by the aforementioned $R^3$ are examples of the aliphatic hydrocarbon group represented by $R^{12}$, $R^{13}$, $R^{14}$, $R^{15}$, $R^{16}$, and $R^{17}$ in the general formula (4). Among the above, methyl, ethyl, propyl, butyl, and vinyl are preferable, and methyl is more preferable, in that it is possible to improve the durability of the film on the anode.

Examples of the $C_{2-6}$ bivalent aliphatic hydrocarbon group including an unsaturated bond as represented by $R^{18}$ include vinylene, propenylene, isopropenylene, butenylene, pentenylene, hexenylene, ethynylene, propynylene, butynylene, pentynylene, and hexynylene.

Examples of the bivalent aromatic hydrocarbon group represented by $R^{18}$ include 1,2-phenylene, 1,3-phenylene, and 1,4-phenylene.

$R^{18}$ is preferably vinylene, ethynylene or 1,4-phenylene, and particularly preferably vinylene, in that it is possible to achieve a surface structure that is highly durable and is less likely to deteriorate by interaction with the cathode.

Examples of compounds represented by the general formula (4) include bis(trimethylsilyl)acetylene dicarboxylate, bis(ethyldimethylsilyl)acetylene dicarboxylate, bis(dimethylpropylsilyl)acetylene dicarboxylate, bis(dimethylbutylsilyl)acetylene dicarboxylate, bis(allyldimethylsilyl)acetylene dicarboxylate, bis(dimethylvinylsilyl)acetylene dicarboxylate, bis(trimethylsilyl)fumarate, bis(dimethylvinylsilyl)fumarate, bis(allyldimethylsilyl)fumarate, bis(trimethylsilyl)itaconate, bis(trimethylsilyl)phthalate, bis(trimethylsilyl)isophthalate, and bis(trimethylsilyl)terephthalate. Among the above, bis(trimethylsilyl)acetylene dicarboxylate and bis(trimethylsilyl)fumarate are preferable, and bis(trimethylsilyl)fumarate is more preferable.

Groups similar to the aliphatic hydrocarbon group represented by the aforementioned $R^3$ are examples of the aliphatic hydrocarbon group represented by $R^{19}$, $R^{20}$, and $R^{21}$ in the general formula (5), and among the above, methyl, ethyl, propyl, butyl and vinyl are preferable, and methyl is more preferable, in that the migration of lithium is not inhibited.

The compound represented by the general formula (5) is preferably trimethylsilylbenzene, triethylsilylbenzene, tripropylsilylbenzene, tributylsilylbenzene, m-bistrimethylsilylbenzene or p-bistrimethylsilylbenzene, and more preferably trimethylsilylbenzene.

Only one type of compound represented by one of the general formulas (1) to (5) may be used, or two or more types may be used in combination. In the nonaqueous electrolytic solution of the present invention, a sufficient effect cannot be achieved if the content of the aforementioned additive(s) is too small; conversely, a too-large content may negatively affect the characteristics of the nonaqueous electrolytic solution, in addition to not achieving any additional effect in proportion to the increased blending amount. Thus, the total content of the aforementioned additive(s) in the nonaqueous electrolytic solution is preferably 0.005-10 mass %, more preferably 0.02-5 mass %, and most preferably 0.05-3 mass %.

Particularly, it is preferable to include a compound represented by the aforementioned general formula (4) in that the internal resistance in the initial characteristics is low. Further, it is particularly preferable to further include a compound represented by one of the general formulas (1) to (3) and (5) in addition to a compound represented by the general formula (4), in that cycle characteristics are improved compared to cases where only a compound represented by the general formula (4) is included.

In cases of employing, in combination, a compound represented by the general formula (4) and a compound represented by one of the general formulas (1) to (3) and (5), the ratio therebetween is preferably from 0:100 to 20:1 (former:latter), and more preferably from 1:10 to 10:1.

As for the organic solvent used for the nonaqueous electrolytic solution of the present invention, it is possible to use one type, or a combination of two or more types, of solvents normally used for nonaqueous electrolytic solutions. Concrete examples include saturated cyclic carbonate compounds, saturated cyclic ester compounds, sulfoxide compounds, sulfone compounds, amide compounds, saturated open-chain carbonate compounds, open-chain ether compounds, cyclic ether compounds, and saturated open-chain ester compounds.

Of the aforementioned organic solvents, saturated cyclic carbonate compounds, saturated cyclic ester compounds, sulfoxide compounds, sulfone compounds, and amide compounds have high relative dielectric constants and thus have the function of increasing the dielectric constant of the nonaqueous electrolytic solution, wherein saturated cyclic carbonate compounds are particularly preferable. Examples of the aforementioned saturated cyclic carbonate compounds include ethylene carbonate, 1,2-propylene carbonate, 1,3-propylene carbonate, 1,2-butylene carbonate, 1,3-butylene carbonate, and 1,1-dimethylethylene carbonate. Examples of the aforementioned saturated cyclic ester compounds include γ-butyrolactone, γ-valerolactone, γ-caprolactone, δ-hexanolactone, and δ-octanolactone. Examples of the aforementioned sulfoxide compounds include dimethylsulfoxide, diethylsulfoxide, dipropylsulfoxide, diphenylsulfoxide, and thiophene. Examples of the aforementioned sulfone compounds include dimethylsulfone, diethylsulfone, dipropylsulfone, diphenylsulfone, sulfolane (also called tetramethylene sulfone), 3-methylsulfolane, 3,4-dimethylsulfolane, 3,4-diphenylmethylsulfolane, sulfolene, 3-methylsulfolene, 3-ethylsulfolene, and 3-bromomethylsulfolene, wherein sulfolane and tetramethylsulfolane are preferable. Examples of the aforementioned amide compounds include N-methylpyrrolidone, dimethylformamide, and dimethylacetamide.

Of the aforementioned organic solvents, saturated open-chain carbonate compounds, open-chain ether compounds, cyclic ether compounds, and saturated open-chain ester compounds can, for example, reduce the viscosity of the nonaqueous electrolytic solution and increase the mobility of electrolyte ions, and can thus improve electricity storage characteristics, such as output density. Further, because of low viscosity, the performance of the nonaqueous electrolytic solution at low temperatures can be improved. Among the above, saturated open-chain carbonate compounds are preferable. Examples of the saturated open-chain carbonate compounds include dimethylcarbonate (DMC), ethylmethylcarbonate (EMC), diethylcarbonate (DEC), ethylbutylcarbonate, methyl-t-butylcarbonate, diisopropylcarbonate, and t-butylpropylcarbonate. Examples of the open-chain ether compounds or cyclic ether compounds include dimethoxyethane (DME), ethoxymethoxyethane, diethoxyethane, tetrahydrofuran, dioxolane, dioxane, 1,2-bis(methoxycarbonyloxy)ethane, 1,2-bis(ethoxycarbonyloxy)ethane, 1,2-bis(ethoxycarbonyloxy)propane, ethylene glycol bis(trifluoroethyl)ether, propylene glycol bis(trifluoroethyl)ether, ethylene glycol bis(trifluoromethyl)ether, and diethylene glycol bis(trifluoroethyl)ether, and among the above, dioxolane is preferable.

As for the aforementioned saturated open-chain ester compounds, monoester compounds and diester compounds in which the total number of carbons per molecule is 2 to 8 are preferable, and concrete examples of compounds include methyl formate, ethyl formate, methyl acetate, ethyl acetate, propyl acetate, isobutyl acetate, butyl acetate, methyl propionate, ethyl propionate, methyl butyrate, methyl isobutyrate, methyl trimethylacetate, ethyl trimethylacetate, methyl malonate, ethyl malonate, methyl succinate, ethyl succinate, methyl 3-methoxypropionate, ethyl 3-methoxypropionate, ethylene glycol diacetyl, and propylene glycol diacetyl, wherein methyl formate, ethyl formate, methyl acetate, ethyl acetate, propyl acetate, isobutyl acetate, butyl acetate, methyl propionate, and ethyl propionate are preferable.

In addition, acetonitrile, propionitrile, nitromethane, or derivatives thereof may be used as organic solvents.

Conventionally known lithium salts may be used as the lithium salt employed in the nonaqueous electrolytic solution of the present invention, and examples include $LiPF_6$, $LiBF_4$, $LiAsF_6$, $LiCF_3SO_3$, $LiCF_3CO_2$, $LiN(CF_3SO_2)_2$, $LiC(CF_3SO_2)_3$, $LiB(CF_3SO_3)_4$, $LiB(C_2O_4)_2$, $LiBF_2(C_2O_4)$, $LiSbF_6$, $LiSiF_5$, $LiAlF_4$, $LiSCN$, $LiClO_4$, $LiCl$, $LiF$, $LiBr$, $LiI$, $LiAlF_4$, and $LiAlCl_4$, and derivatives of the above. Among the above, because of excellent electric characteristics, it is preferable to use one or more types of salts selected from the group consisting of $LiPF_6$, $LiBF_4$, $LiClO_4$, $LiAsF_6$, $LiCF_3SO_3$, $LiC(CF_3SO_2)_3$, derivatives of $LiCF_3SO_3$, and derivatives of $LiC(CF_3SO_2)_3$.

It is preferable to dissolve the aforementioned lithium salt(s) in the aforementioned organic solvent(s) such that the concentration thereof in the nonaqueous electrolytic solution of the present invention is preferably 0.1-3.0 mol/L, and particularly 0.5-2.0 mol/L. If the concentration of the lithium salt(s) is lower than 0.1 mol/L, there are cases where a sufficient electric current density cannot be obtained, whereas if the concentration is higher than 3.0 mol/L, the stability of the nonaqueous electrolytic solution may be impaired. Two or more types of lithium salts may be used in combination.

Further, in the nonaqueous electrolytic solution of the present invention, a flame retardant, such as a halogen-based or phosphorus-based flame retardant, may be added as appropriate in order to impart flame resistance. If the amount of flame retardant added is too small, a sufficient flame-retardant effect cannot be achieved; conversely, a too-large amount may negatively affect the characteristics of the nonaqueous electrolytic solution, in addition to not achieving any additional effect in proportion to the increased blending amount. Thus, the amount of flame retardant with respect to the organic solvent(s) constituting the nonaqueous electrolytic solution of the present invention is preferably 1-50 mass %, and more preferably 3-10 mass %.

In the electricity storage device of the present invention, it is preferable to use a separator between the cathode and the anode. As for the separator, it is possible to use any normally-used polymeric microporous film without particular limitation. Examples of such films include films made of: a polymer compound mainly constituted by polyethylene, polypropylene, polyvinylidene fluoride, polyvinylidene chloride, polyacrylonitrile, polyacrylamide, polytetrafluoroethylene, polysulfone, polyethersulfone, polycarbonate, polyamide, polyimide, polyether such as polyethylene oxide or polypropylene oxide, cellulose such as carboxymethyl cellulose or hydroxypropyl cellulose, or poly(meth)acrylic acid or one of various esters thereof; a derivative of the aforementioned polymer compound; a copolymer thereof; or a mixture thereof. The film may be used singly, or a plurality of films may be laminated into a multi-layer film. Further, various additives may be employed in the film(s), and the types and content of additives are not particularly limited. Among such films, films made of polyethylene, polypropylene, polyvinylidene fluoride, polysulfone, or a cellulose are preferably used in the electricity storage device of the present invention.

The film is made microporous such that the nonaqueous electrolytic solution can permeate therethrough and ions can easily pass therethrough. Examples of methods for making the film microporous include: the phase separation method in which a film is formed by subjecting a solution of a polymer compound and a solvent to micro-phase separation, and the film is made microporous by extracting and removing the solvent; and the drawing method in which a molten polymer compound is extruded into a film at high draft and then subjected to a heat treatment to align the crystals in a single direction, and then the film is drawn to form gaps between the crystals and is thus made microporous. The method is selected as appropriate depending on the film to be used.

In the electricity storage device of the present invention, with the aim of further improving safety, additives such as phenol-based antioxidants, phosphorus-based antioxidants, thioether-based antioxidants, and hindered amine compounds may be added to the anode, the cathode, the nonaqueous electrolytic solution, and the separator.

Concrete examples of the electricity storage device of the present invention include capacitors, such as electric double-layer capacitors and hybrid capacitors.

Figure 1:
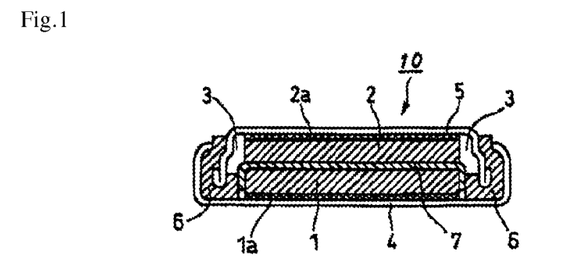
FIG. 1 is a vertical sectional view that schematically illustrates an example of a structure of a coin-shaped electricity storage device which is an electricity storage device of the present invention.

The electricity storage device (capacitor) of the present invention having the aforementioned structure is not particularly limited in terms of its shape, and may be coin-shaped, circular-cylindrical, or rectangular, or may take various other shapes. FIG. 1 illustrates an example of a coin-shaped capacitor which is an electricity storage device of the present invention, and FIGS. 2 and 3 illustrate an example of a circular-cylindrical capacitor.

In the coin-shaped capacitor 10 illustrated in FIG. 1, 1 indicates an activated carbon cathode, 1a indicates a cathode charge collector, 2 indicates an anode made of a carbonaceous material that can occlude and release lithium ions released from the cathode, 2a indicates an anode charge collector, 3 indicates a nonaqueous electrolytic solution of the present invention, 4 indicates a stainless-steel-made cathode case, 5 indicates a stainless-steel-made anode case, 6 indicates a polypropylene-made gasket, and 7 indicates a polyethylene-made separator.

Figure 2:
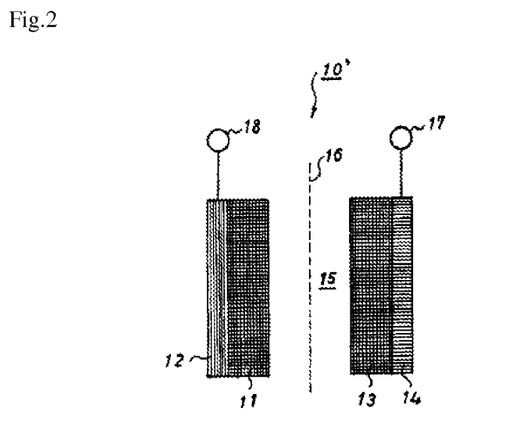
FIG. 2 is a schematic diagram illustrating a basic configuration of a circular-cylindrical electricity storage device which is an electricity storage device of the present invention.
Figure 3:
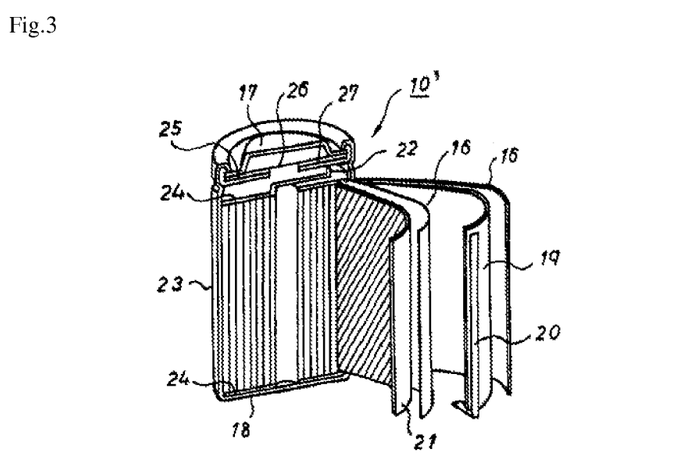
FIG. 3 is a perspective view illustrating a cross section of the internal structure of the circular-cylindrical electricity storage device which is an electricity storage device of the present invention.

In the circular-cylindrical electricity storage device 10, 10' illustrated in FIGS. 2 and 3, 11 indicates an anode, 12 indicates an anode charge collector, 13 indicates a cathode, 14 indicates a cathode charge collector, 15 indicates a nonaqueous electrolytic solution of the present invention, 16 indicates a separator, 17 indicates a cathode terminal, 18 indicates an anode terminal, 19 indicates an anode plate, 20 indicates an anode lead, 21 indicates a cathode plate, 22 indicates a cathode lead, 23 indicates a case, 24 indicates an insulating plate, 25 indicates a gasket, 26 indicates a safety valve, and 27 indicates a PTC element.

EXAMPLES

The present invention is described in further detail below according to Examples and Comparative Examples. Note, however, that the present invention is not limited whatsoever to the following Examples etc. It should be noted that "parts" and "%" in the following Examples are indicated by mass, unless particularly stated otherwise.

The following Examples 1 to 17 and Comparative Examples 1 to 6 are working examples of the electricity storage device of the present invention and comparative examples thereof.

Examples 1 to 17 and Comparative Examples 1 to 6

Preparation and Evaluation of Electricity Storage Device

Electricity storage devices according to the present invention and comparative examples were prepared as described below. An initial characteristic test and a cycle characteristic test were performed by using the prepared electricity storage devices, and the electricity storage devices were evaluated.

[Preparation of Anode A]

Ninety (90) parts by mass of sparingly-graphitizable carbon as an active material, 5 parts by mass of acetylene black, and 5 parts by mass of polyvinylidene fluoride (PVDF) as a binder were mixed, and then, this was dispersed in 140 parts by mass of N-methyl-2-pyrrolidone (NMP) and made into a slurry. This slurry was coated onto a copper-made anode charge collector and was then dried, and then press-formed. Then, the anode was doped with lithium by connecting the anode to a lithium foil in an electrolytic solution for a predetermined period of time. The anode was cut into a disk shape of a predetermined size, thus obtaining Anode A.

[Preparation of Anode B]

Anode B was prepared according to the same method as for preparing Anode A, except that easily-graphitizable carbon was used as the active material instead of sparingly-graphitizable carbon.

[Preparation of Cathode]

A cathode was prepared according to the same method as for preparing Anode A, except that activated carbon was used as the active material instead of sparingly-graphitizable carbon.

[Preparation of Nonaqueous Electrolytic Solution]

Step 1: Preparation of Electrolyte Solution

To a mixed solvent including 50 vol % propylene carbonate and 50 vol % diethylcarbonate, $LiPF_6$ was added and dissolved so that the concentration was 1 mol/L, thus obtaining the electrolyte solution.

Step 2: Preparation of Nonaqueous Electrolytic Solution

The following Compounds A1 to A6 (compounds represented by one of the general formulas (1) to (5)) and Comparative Compounds A'1 and A'2 were each dissolved at respective proportions indicated in Table 1 into the electrolyte solution prepared in Step 1. It should be noted that each number in the parentheses in Table 1 indicates the concentration (mass %) in each nonaqueous electrolytic solution.

TABLE 1

| Nonaqueous electrolytic solution | Electrolytic solution additive(s) |
| --- | --- |
| No. 1 | A1 (0.5) |
| No. 2 | A2 (0.5) |
| No. 3 | A3 (0.5) |
| No. 4 | A4 (0.5) |
| No. 5 | A5 (0.5) |
| No. 6 | A6 (0.5) |
| No. 7 | A5 (0.5), A1 (0.3) |
| No. 8 | A5 (0.5), A2 (0.3) |
| No. 9 | A5 (0.5), A3 (0.3) |
| No. 10 | A5 (0.5), A4 (0.3) |
| No. 11 | A5 (0.5), A6 (0.5) |

Compound A1: Tris(2-propynyl)phosphate (compound represented by general formula (1))
Compound A2: 2,4-Hexadiyne-1,6-diol tetraethyl diphosphate (compound represented by general formula (2))
Compound A3: 1,3-Difluoro-1,1,3,3-tetramethyldisiloxane (compound represented by general formula (3))
Compound A4: 1,2-Bis(difluoro(methyl)silyl)ethane (compound represented by general formula (3))
Compound A5: Bis(trimethylsilyl) fumarate (compound represented by general formula (4))
Compound A6: Trimethylsilylbenzene (compound represented by general formula (5))
Compound A'1: Vinylene carbonate
Compound A'2: Propanesultone

[Evaluation of Electricity Storage Device]

The disk-shaped Anode A or Anode B and the disk-shaped cathode that were prepared were held inside a case, with a 25-μm-thick cellulose-made separator sandwiched between the anode and cathode. Then, the pre-prepared nonaqueous electrolytic solutions Nos. 1 to 9 or comparative solutions Nos. 1 to 3 were each poured into the respective cases such that each combination between the nonaqueous electrolytic solution and the anode matches the description in Table 2, each case was tightly closed and sealed, to thus prepare the respective electricity storage devices of Examples 1 to 14 and Comparative Examples 1 to 6 (each having a coin shape with a diameter of 20 mm and thickness of 3.2 mm).

Each prepared electricity storage device was subjected to an initial characteristic test and a cycle characteristic test according to the following test methods. The internal resistance ratio was found in the initial characteristic test. The discharge capacity maintainability rate and the internal resistance increase rate were found in the cycle characteristic test. The test results are shown in Table 2 below. It should be noted that, the lower the value of the internal resistance ratio, the better the initial characteristics of the electricity storage device. Further, the higher the discharge capacity maintainability rate and the lower the internal increase rate, the better the cycle characteristics of the electricity storage device.

Method for Measuring Internal Resistance Ratio in Initial Characteristic Test:

Each electricity storage device was placed in a constant temperature oven at 20° C., and was subjected, six times, to an operation of constant-current constant-voltage charging up to 3.8 V with a charging current of 0.3 $mA/cm^2$ (current value equivalent to 0.2 C) followed by constant-current discharging down to 2.2 V with a discharging current of 0.3 $mA/cm^2$ (current value equivalent to 0.2 C; 1 C is a current value with which the electricity storage capacity is discharged in one hour). After measuring the discharge capacity in the sixth operation (initial discharge capacity), each electricity storage device was first subjected to constant-current charging with a charging current of 1.5 $mA/cm^2$ (current value equivalent to 0.2 C) up to SOC 50%, and was then scanned at frequencies of from 100 kHz to 0.02 Hz by using an AC impedance measurement device (product from Bio-Logic; product name: VSP), to create a Cole-Cole plot in which the Y axis indicates the imaginary part and the X axis indicates the real part. Then, in this Cole-Cole plot, a circle was fitted to the arc portion, and the diameter of the arc was found as the initial internal resistance, and according to the equation below, the internal resistance ratio (%) was found as the percentage of the initial internal resistance with respect to the initial internal resistance in Example 5, which was considered as 100.

Internal resistance ratio (%)=["Initial internal resistance"/"Initial internal resistance in Example 5"]×100

Measurement Method in Cycle Characteristic Test:

Each electricity storage device after the initial characteristic test was placed inside a constant temperature oven at 60° C., and was repeatedly subjected, 1000 times, to a cycle of constant-current charging up to 3.8 V with a charging current of 7.5 $mA/cm^2$ (current value equivalent to 5 C) followed by constant-current discharging down to 2.2 V with a discharging current of 7.5 $mA/cm^2$. From the $1000^{th}$ discharge capacity and the initial discharge capacity, the discharge capacity maintainability rate (%) was found according to the following equation. Then, the ambient temperature was returned to 20° C., the internal resistance at 20° C. was measured, and from this measurement result, the internal resistance increase rate was found according to the following equation.

Discharge capacity maintainability rate (%)=["Discharge capacity in the $1000^{th}$ cycle"/"Initial discharge capacity"]×100

Internal resistance increase rate (%)=[("Internal resistance after 1000 cycles"−"Initial internal resistance")/"Initial internal resistance"]×100

TABLE 2

|  | Anode | Nonaqueous electrolytic solution | Initial characteristic Internal resistance ratio | Cycle characteristic test | | |
|---|---|---|---|---|---|---|
|  |  |  |  | Discharge capacity maintainability rate | Internal resistance increase rate | |
| Example 1 | A | No. 1 | 110 | 97 | 8 |
| Example 2 | A | No. 2 | 115 | 98 | 9 |
| Example 3 | A | No. 3 | 105 | 94 | 5 |
| Example 4 | A | No. 4 | 117 | 100 | −7 |
| Example 5 | A | No. 5 | 100 | 95 | 13 |
| Example 6 | A | No. 6 | 105 | 90 | 14 |
| Example 7 | A | No. 7 | 108 | 97 | 7 |
| Example 8 | A | No. 8 | 110 | 98 | 6 |
| Example 9 | A | No. 9 | 99 | 95 | 7 |
| Example 10 | A | No. 10 | 110 | 100 | −5 |
| Example 11 | A | No. 11 | 103 | 100 | −6 |
| Example 12 | B | No. 5 | 112 | 88 | 15 |
| Example 13 | B | No. 7 | 116 | 89 | 13 |
| Example 14 | B | No. 8 | 118 | 90 | 10 |
| Example 15 | B | No. 9 | 110 | 86 | 8 |
| Example 16 | B | No. 10 | 120 | 92 | −3 |
| Example 17 | B | No. 11 | 106 | 93 | −4 |
| Comp. Example 1 | A | Comp. No. 1 | 97 | 78 | 25 |
| Comp. Example 2 | A | Comp. No. 2 | 99 | 94 | 46 |
| Comp. Example 3 | A | Comp. No. 3 | 102 | 96 | 67 |
| Comp. Example 4 | B | Comp. No. 1 | 97 | 65 | 31 |
| Comp. Example 5 | B | Comp. No. 2 | 105 | 78 | 51 |
| Comp. Example 6 | B | Comp. No. 3 | 117 | 77 | 88 |

As is clear from the results of Table 2, it is apparent that the electricity storage device of the present invention has excellent internal resistance and discharge capacity after the cycle characteristic test at 60° C., and can maintain excellent capacitor characteristics.

REFERENCE SIGNS LIST

1: Cathode
1a: Cathode charge collector
2: Anode
2a: Anode charge collector
3: Nonaqueous electrolytic solution
4: Cathode case
5: Anode case
6: Gasket
7: Separator
10: Coin-shaped electricity storage device
10': Circular-cylindrical electricity storage device
11: Anode
12: Anode charge collector
13: Cathode
14: Cathode charge collector
15: Nonaqueous electrolytic solution
16: Separator
17: Cathode terminal
18: Anode terminal
19: Anode plate
20: Anode lead
21: Cathode plate
22: Cathode lead
23: Case
24: Insulating plate
25: Gasket
26: Safety valve
27: PTC element

The invention claimed is:

1. An electricity storage device, comprising
an anode into/from which lithium can be intercalated and deintercalated,
a cathode that includes activated carbon, and
a nonaqueous electrolytic solution in which a lithium salt is dissolved in an organic solvent, wherein the nonaqueous electrolytic solution includes at least one type of compound represented by one of the following general formulas (1) to (4):

(1)

(2)

(3)

(4)

in the above general formula (1), $R^1$ and $R^2$ each independently represent a hydrogen atom or a $C_{1-8}$ alkyl group, $R^3$ represents a $C_{1-8}$ aliphatic hydrocarbon group that includes or does not include an unsaturated bond (s), and the aliphatic hydrocarbon group represented by $R^3$ may be substituted by a halogen atom (s);

in the above general formula (2), $R^4$ and $R^5$ each independently represent a hydrogen atom or a $C_{1-8}$ alkyl group, $R^6$ represents a $C_{1-8}$ aliphatic hydrocarbon group that includes or does not include an unsaturated bond (s), the aliphatic hydrocarbon group represented by $R^6$ may be substituted by a halogen atom, and n represents 1 or 2;

in the above general formula (3), $R^7$, $R^8$, $R^9$, and $R^{10}$ each independently represent a $C_{1-8}$ aliphatic hydrocarbon group that includes or does not include an unsaturated bond (s), or a $C_{6-8}$ aromatic hydrocarbon group, $R^7$ and $R^8$ may also represent a fluorine atom, the aliphatic hydrocarbon group and the aromatic hydrocarbon group represented by $R^7$, $R^8$, $R^9$, and $R^{10}$ may be substituted by a halogen atom (s), and $R^{11}$ represents an oxygen atom or a $C_{1-8}$ alkylene group that includes or does not include an ether group (s); and in the above general formula (4), $R^{12}$, $R^{13}$, $R^{14}$, $R^{15}$, $R^{16}$, and $R^{17}$ each independently represent a $C_{1-8}$ aliphatic hydrocarbon group that includes or does not include an unsaturated bond (s), and $R^{18}$ represents a $C_{2-6}$ bivalent aliphatic hydrocarbon group including an unsaturated bond (s), or a bivalent aromatic hydrocarbon group.

2. The electricity storage device according to claim 1, wherein the nonaqueous electrolytic solution includes a compound represented by the above general formula (4).

3. The electricity storage device according to claim 2, wherein the nonaqueous electrolytic solution further includes at least a compound represented by one of the above general formula (1), (2) or (3), or the following general formula (5):

in the above general formula (5), $R^{19}$, $R^{20}$, and $R^{21}$ each independently represent a $C_{1-8}$ aliphatic hydrocarbon group that includes or does not include an unsaturated bond (s), and m represents 1 or 2.

4. The electricity storage device according to claim 1, wherein the nonaqueous electrolytic solution includes a compound represented by the above general formula (3).

5. The electricity storage device according to claim 4, wherein the nonaqueous electrolytic solution further includes at least a compound represented by one of the above general formula (1) or (2), or the above general formula (5).

6. The electricity storage device according to claim 1, wherein the electricity storage device is a capacitor.

7. The electricity storage device according to claim 2, wherein the electricity storage device is a capacitor.

8. The electricity storage device according to claim 3, wherein the electricity storage device is a capacitor.

9. The electricity storage device according to claim 4, wherein the electricity storage device is a capacitor.

10. The electricity storage device according to claim 5, wherein the electricity storage device is a capacitor.

* * * * *